United States Patent
Hwang et al.

(10) Patent No.: US 8,121,829 B2
(45) Date of Patent: Feb. 21, 2012

(54) METHOD AND APPARATUS FOR CONSTRUCTING TRANSLATION KNOWLEDGE

(75) Inventors: Young-Sook Hwang, Daejeon (KR); Young Kil Kim, Daejeon (KR); Sung Kwon Choi, Daejeon (KR); Chang Hyun Kim, Daejeon (KR); Young-Ae Seo, Daejeon (KR); Ki Young Lee, Daejeon (KR); Seong Il Yang, Daejeon (KR); Yoon-Hyung Roh, Daejeon (KR); Chang-Hao Yin, Daejeon (KR); Oh Woog Kwon, Daejeon (KR); Eun jin Park, Busan (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 872 days.

(21) Appl. No.: 12/155,127

(22) Filed: May 29, 2008

(65) Prior Publication Data

US 2009/0043564 A1 Feb. 12, 2009

(30) Foreign Application Priority Data

Aug. 9, 2007 (KR) .................. 10-2007-0080065

(51) Int. Cl.
*G06F 17/28* (2006.01)

(52) U.S. Cl. ................... 704/4; 704/2; 704/277
(58) Field of Classification Search .......... 704/1–10, 704/257, 277, 255, 270, 270.1
See application file for complete search history.

(56) References Cited

U.S. PATENT DOCUMENTS

| | | | |
|---|---|---|---|
| 5,687,383 A | 11/1997 | Nakayama et al. | |
| 5,848,385 A * | 12/1998 | Poznanski et al. | 704/4 |
| 7,249,012 B2 | 7/2007 | Moore | |
| 7,330,810 B2 | 2/2008 | Kim et al. | |
| 7,356,457 B2 * | 4/2008 | Pinkham et al. | 704/2 |
| 2007/0150260 A1 | 6/2007 | Lee et al. | |

FOREIGN PATENT DOCUMENTS

| | | |
|---|---|---|
| KR | 10-2001-0109047 A | 12/2001 |
| KR | 10-2001-0110496 A | 12/2001 |
| KR | 10-2003-0094632 A1 | 12/2003 |
| KR | 1020040044176 | 5/2004 |
| KR | 10-2007-0058950 A | 6/2007 |

OTHER PUBLICATIONS

Fuji Ren, et al., "Semi-Automatic Acquisition Translation Knowledge from Parallel Corpora" 2002 IEEE SMC, TA1E3.

* cited by examiner

*Primary Examiner* — Huyen X. Vo
(74) *Attorney, Agent, or Firm* — Staas & Halsey LLP (57) ABSTRACT

The present invention relates to a method and apparatus for constructing translation knowledge to be used in a translator. According to the invention, a source-language sentence and a target-language sentence are converted by receiving the source-language sentence and the target-language sentence corresponding to the source-language sentence and attaching a prototype, a part-of-speech, relative position information, and syntactic information in a base phrase to each morpheme of the source-language sentence and the target-language sentence. Then, word alignment and syntactic alignment are performed in the converted source-language sentence and target-language sentence, thereby extracting translation knowledge on words and syntaxes, translation knowledge on a subcategory of a bilingual inflected-word, and translation knowledge on a bilingual sentence pattern based on the results of the word and syntactic alignment.

12 Claims, 5 Drawing Sheets

Head word (inflected word) syntax of sentence : 골절되었습니다 (Korean) - fractured(English)
Subcategory : <골절되다, 3곳 : 이> - <fractured, my leg in three places>
<골절되다, 계단에서 떨어지 : 어서> - <fractured, I fell down the stairs>

METHOD AND APPARATUS FOR CONSTRUCTING TRANSLATION KNOWLEDGE

CROSS-REFERENCE TO RELATED APPLICATION

This application claims priority to and the benefit of Korean Patent Application No. 10-2007-0080065 filed in the Korean Intellectual Property Office on Aug. 9, 2007, the entire contents of which are incorporated herein by reference.

BACKGROUND OF THE INVENTION (a) Field of the Invention

The present invention relates to a method of automatically constructing translation knowledge to be used in a translation apparatus. More particularly, the invention relates to a method of cumulatively and automatically constructing translation knowledge to be used in a translation apparatus that automatically translates Korean having an agglutinative and inflective phenomenon in the extreme into English and Chinese having little or no agglutinative and inflective phenomenon by using a previously held bilingual dictionary, an unsupervised learning, and a language processing module.

(b) Description of the Related Art

Translation knowledge can be usefully used in various ways regardless of methodology of a machine translation. Particularly, in a frame of a sentence and a subcategory of an inflected word above a word and syntax, the translation knowledge can also be usefully used in, for example, a translation system and of methodology of a machine translation. Particularly, in a frame of a sentence and a subcategory of an inflected word above a word and syntax, the translation knowledge can also be usefully used in, for example, a translation system and foreign language learning. That is, acquired translation knowledge can be used in an example-based machine translation system and a program for the foreign language learning as well as a statistics-based machine translation system.

The machine translation system receives text that is composed of source-language sentences, translates the received source language into a target language, and outputs the translated result. In this case, the translation is performed by using a bilingual dictionary of word/syntax, translation rules, a translation pattern, and so on. Alternatively, the translation is performed by the learning of a statistical translation model. Generally, since accurate knowledge is essential for the translation system using the translation rule or the translation pattern, the translation knowledge is universally acquired by experts. However, considerable time and cost are required for the acquisition of the translation knowledge. To overcome this problem, many studies have been conducted so as to automatically extract the knowledge or to semi-automatically acquire the knowledge by developing tools.

One of existing approaches is Feedback Cleaning of Machine Translation Rules using Automatic Evaluation by Kenji Imamura. This relates to a method of automatically leaning and refining parallel-translation knowledge and conversion rules for Japanese-English machine translation operated in an example-based way and a conversion-driven way.

According to the approach of Kenji Imamura, Japanese and English sentences are syntactically analyzed by using a syntactic analyzer of each language with respect to a pair of parallel sentences in Japanese and English, respectively, and the syntaxes are aligned by connecting the syntaxes having the same syntax category in English and Japanese to each other, after aligning words by using an algorithm for word alignment. Furthermore, according to the above-described approach, parallel-translation information on the syntax and parallel-translation knowledge on the word are acquired from results of a syntactic alignment. In addition, the conversion rules are extracted from the results of the syntactic alignment, the conversion rules being composed of the syntactic category and a functional language carrying out a grammatical role. The conversion rules include a syntactic category of the syntax to be converted and a pattern of source-language syntax, a pattern of target-language syntax, and examples of the source-language syntax. Furthermore, a process of refining a bilingual corpus is performed so as to extract accurate conversion rules. The bilingual corpus is classified into a literal translation corpus and a non-literal translation corpus. The literal translation corpus is composed of pairs of sentences for maximizing alignment links of words that constitute the source-language sentence and the target-language sentence, and others are considered as a non-literal translation corpus. The conversion rules are extracted from the literal translation corpus. If a phrase exists in the non-literal translation corpus, a generalized syntactic conversion rule is also extracted from the phrase. In other parts that are difficult to generalize, the translation pattern is extracted by using vocabulary in itself.

However, according to the methodology of Kenji Imamura, only when two languages have the same syntactic category can the syntactic alignment be attempted. In a case of applying it to two languages with different structures of language and cultural background, the above-described methodology reduces the reproduction ratio of the extracted translation knowledge. Moreover, even though the translation knowledge is constructed, the constructed translation knowledge becomes too generalized knowledge of the sentence. Accordingly, ambiguity of the word and complexity of word rearrangement have occurred in the above-described methodology.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of automatically constructing translation knowledge having advantages of minimizing ambiguity in meaning that is generated in a translation process and complexity of word rearrangement due to a structural difference of language and reducing time and cost.

An exemplary embodiment of the present invention provides a method of constructing translation knowledge including: receiving a source language sentence and a target language sentence corresponding to translation of the source language sentence; converting the source language sentence and the target language sentence into a form that is provided with syntactic information; performing word alignment and syntactic alignment of the converted source language sentence and the converted target language sentence; and extracting translation knowledge on a subcategory of a bilingual inflected-word from results of the word alignment and the syntactic alignment by using dependency information.

Another embodiment of the invention provides an apparatus for constructing translation knowledge including: a converting section that converts a source-language sentence and a target-language sentence by receiving the source-language sentence and the target-language sentence corresponding to the source-language sentence and attaching a prototype, a part-of-speech, and relative position information and syntactic information in a base phrase to each morpheme of the source-language sentence and the target-language sentence; a word-syntax aligning module that aligns words and syntaxes by applying a previously held bilingual lexicon and an algorithm for an unsupervised learning; and a translation knowledge acquiring module that acquires translation knowledge on a word and syntax, translation knowledge on a subcategory of a bilingual inflected-word, and translation knowledge on a bilingual sentence pattern based on results of syntactic alignment by the module for aligning the word and syntaxes.

According to the invention, by constructing translation knowledge on a word and syntax, translation knowledge on a subcategory of an inflected word having a vocabulary level, and translation knowledge on a sentence pattern for an idiomatic expression and clustering the translation knowledge on word/syntax having the same meaning, the translation knowledge is generalized. For this reason, according to the invention, ambiguity in the word and syntax is resolved, and meaning disambiguation is achieved, since a subcategory pattern of the inflected word and a translation pattern of the sentence pattern are constructed according to a lexical/semantic context. Moreover, the word rearrangement due to a structural difference of a language may be resolved by constructing a simple sentence as a bilingual translation pattern. The resolution of ambiguity and the reduction of computation complexity eventually improve the accuracy and efficiency of translation.

Furthermore, it is possible to minimize total time and cost required for knowledge acquisition by automating all acquiring processes of the translation knowledge.

In addition, the automatically constructed translation knowledge is the translation knowledge of a sentence unit above a simple word or syntax. Moreover, since the translation knowledge on the subcategory of the inflected word clearly indicates the relationship between argument and the inflected word, which respond to each other depending on the context, it is possible to manufacture an applied program such as an assistant of foreign language learning and to utilize the applied program. Accordingly, automatically constructed translation knowledge can expand the utilization scope in industrial/educational dimensions.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that when it is referred to that some parts "include" some constituent elements, this does not exclude the presence of other constituent elements throughout the specification, unless otherwise described in particular. In addition, "section" and "~or" described in the specification process at least one of a function and an operation, which can be realized by hardware, software, or a combination thereof.

A method and apparatus for constructing translation knowledge according to an exemplary embodiment of the invention will be now described in detail with reference to the drawings.

Figure 1:
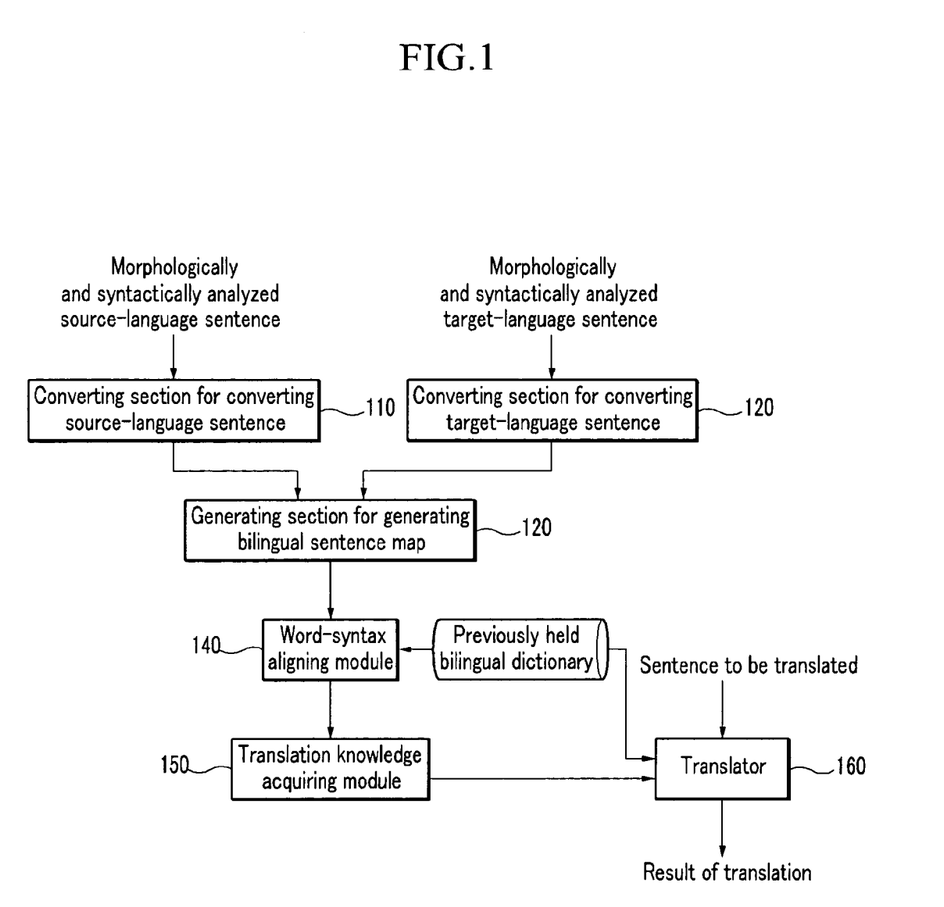
FIG. 1 is a schematic diagram illustrating an apparatus for constructing translation knowledge according to an exemplary embodiment of the present invention.

FIG. 1 is a schematic diagram illustrating an apparatus for constructing the translation knowledge according to the exemplary embodiment of the invention.

As shown in FIG. 1, the apparatus for constructing the translation knowledge according to the exemplary embodiment of the invention includes a converting section 110 for converting a source-language sentence, a converting section 120 for converting a target-language sentence, a generating section 130 for generating a bilingual sentence map, a word-syntax aligning module 140, a translation knowledge acquiring module 150, and a translator 160.

The converting section 110 receives the source-language sentence and reconstructs the sentence so as to utilize the prototype and the part-of-speech of a morpheme, and the dependency relation between the morphemes, as feature information of the morpheme. Furthermore, the converting section 120 receives the target-language sentence and reconstructs the sentence so as to utilize the prototype and the part-of-speech of a morpheme and the dependency relationship between the morphemes, as feature information of the morpheme. The generating section 130 encodes the morpheme of the source-language sentence and the target-language sentence into a unique identification number of the morpheme so as to be capable of effectively aligning words from a pair of the source-language sentence and the target-language sentence. The word-syntax aligning module 140 automatically aligns the words and syntaxes by applying a previously held bilingual dictionary and algorithm for unsupervised learning. The translation knowledge acquiring module 150 acquires the translation knowledge based on the results of word alignment and syntactic alignment. The translator 160 receives the sentence to be translated, automatically translates the sentence by using the acquired translation knowledge, and outputs the result of the translation.

Figure 2:
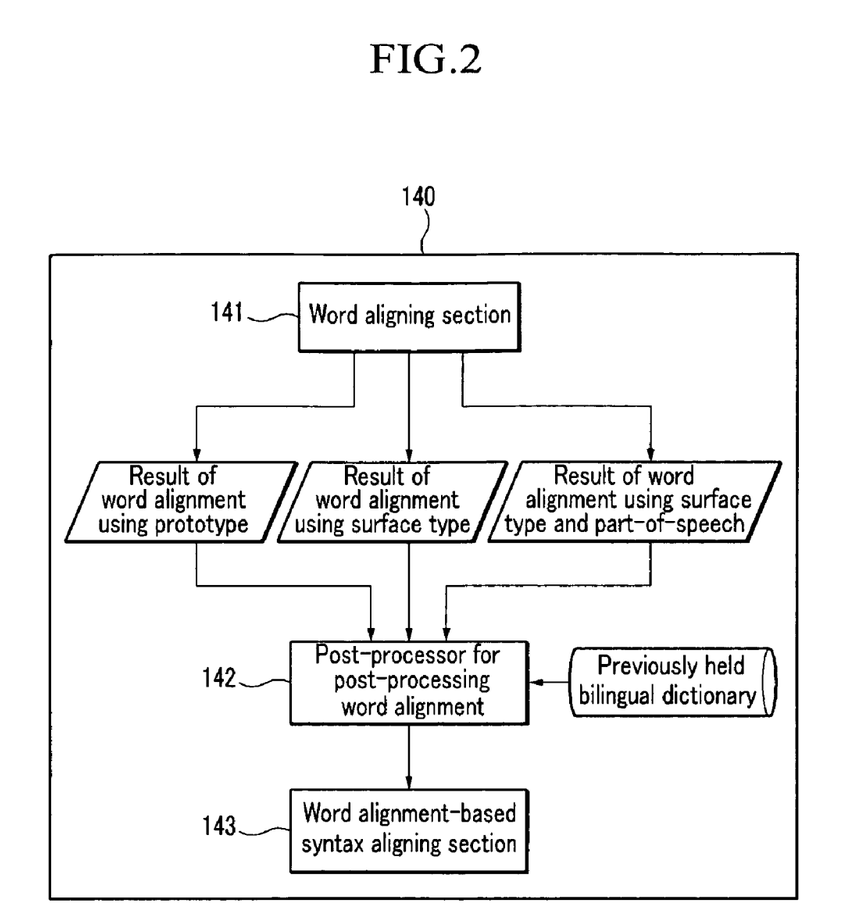
FIG. 2 is a schematic diagram illustrating a word-syntax aligning module 140 according to the exemplary embodiment of the invention.

FIG. 2 is a schematic diagram illustrating the word-syntax aligning module 140 according to the exemplary embodiment of the invention.

The word-syntax aligning module 140 includes a word aligning section 141, a post-processor 142 for post-processing word alignment, and a word alignment-based syntax aligning section 143.

The word aligning section 141 aligns the words by means of the unsupervised learning and outputs a plurality of results of the word alignment using at least one of the surface type, the prototype, and the part-of-speech of the morpheme. By using the previously held bilingual dictionary, the post-processor 142 modifies an error of the word alignment that is output by the word aligning section 141. The word alignment-based syntax aligning section 143 aligns the syntax by using the result of word alignment and the information on the dependency relationship between the syntaxes.

Figure 3:
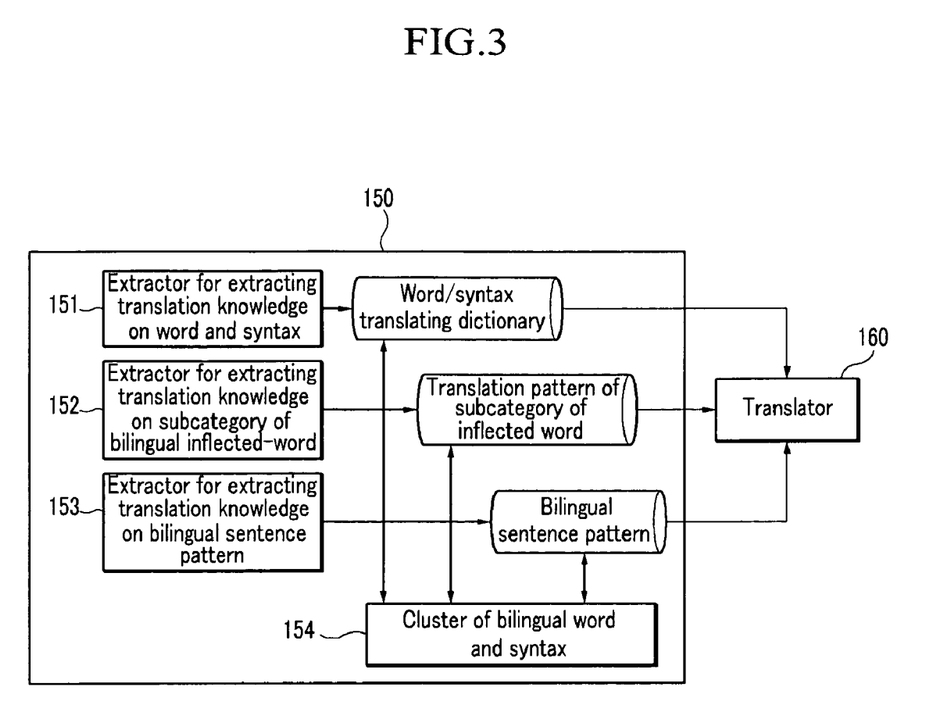
FIG. 3 is a schematic diagram illustrating a translation knowledge acquiring module 150 according to the exemplary embodiment of the invention.

FIG. 3 is a schematic diagram illustrating the translation knowledge acquiring module 150 according to the exemplary embodiment of the invention.

The translation knowledge acquiring module 150 includes an extractor 151 for extracting the translation knowledge on the word and syntax, an extractor 152 for extracting the translation knowledge on a subcategory of a bilingual inflected-word, an extractor 153 for extracting the translation knowledge on a bilingual sentence pattern, and a cluster 154 of a bilingual word and syntax.

The extractor 151 receives the result of the word/syntax alignment, extracts the translation information on the words and syntaxes, and stores them in a database of a word/syntax translating dictionary. The extractor 152 searches the inflected word serving as a head word of the source-language sentence and forms a subcategory frame of the inflected word by tracking the word/syntax that depends on the inflected word. After expressing the parallel-translation word/syntax of the target language as a form of a feature structure, the extractor 152 extracts the translation knowledge on the subcategory of the bilingual inflected-word by connecting information on the parallel-translation feature structure to the subcategory frame of the inflected word of the source language. Furthermore, the extractor 152 stores the extracted translation knowledge in a database for a translation pattern of the subcategory of the inflected word. The extractor 153 extracts the translation pattern with the sentence using an idiomatic expression and stores it in a database for a bilingual sentence pattern. The cluster 154 divides the extracted translation knowledge into groups having the same meaning and allows the extracted translation knowledge to be generalized.

Figure 4:
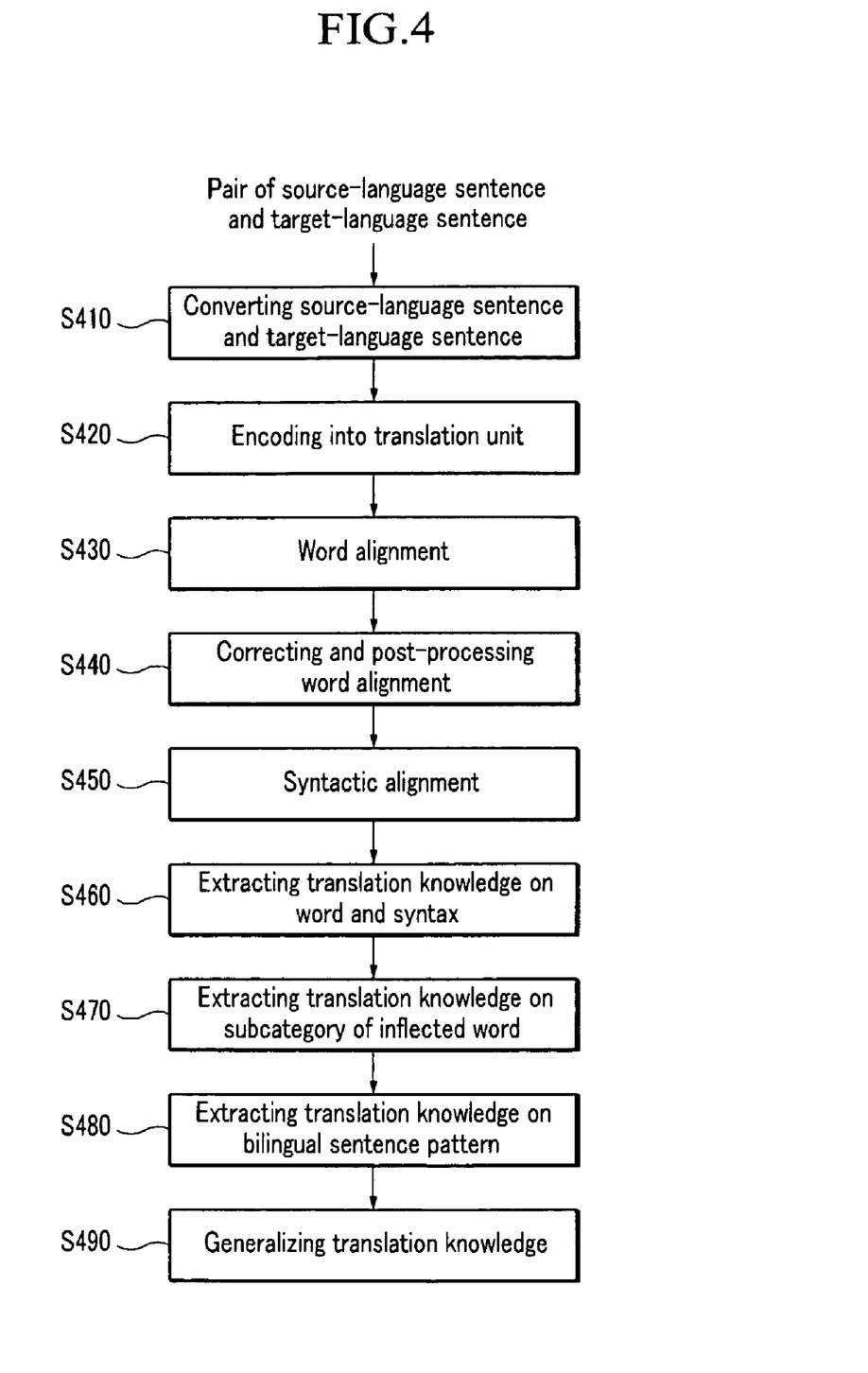
FIG. 4 is a flowchart illustrating a method of constructing translation knowledge according to the exemplary embodiment of the invention.

The method of constructing the translation knowledge according to the exemplary embodiment of the invention will now be described in detail with reference to FIG. 4. FIG. 4 is a flowchart illustrating the method of constructing the translation knowledge according to the exemplary embodiment of the invention.

In the apparatus for constructing the translation knowledge according to the exemplary embodiment of the invention, the apparatus receives pairs of a source-language sentence and a target-language sentence and aligns the words and syntaxes of the source-language sentence and the target-language sentence. Then, the apparatus extracts the translation knowledge from the results of the word and syntax alignment.

First, the pairs of a source-language sentence and a target-language sentence are input into the apparatus for constructing the translation knowledge, the source-language sentence and the target-language sentence being aligned by the sentence, respectively. The source language is input into the translator using the translation knowledge, and the target language is output as a form of translation with respect to the source language from the translator using the translation knowledge.

For example, in a case of constructing the translation knowledge using a translator that translates Korean into English or Chinese, Korean serves as the source language, and English or Chinese serves as the target language. After performing a morpheme analysis, a part-of-speech tagging, and a syntactic analysis, the source-language sentence and the target-language sentence are input. For example, when the source-language sentence is "계단에서 떨어지어서 세 곳이 골절되었습니다. (Transliteration: Gae-dan-ae-suh-tuhl-uh-jy-uh-suh-se-got-i-gol-juhl-doi-ut-seub-ni-da; Translation:" three places are fractured as result of falling off the stairs)" in Korean, an input type may be expressed as follows.

<Result of Korean Syntactic Analysis>

골절되(Transliteration: gol-juhl-doi)[general verb]+었(Transliteration: ut)[pre-final ending of past tense]+습니다(Transliteration: seub-ni-da) [declarative final-ending]+.[ending mark]

세 – 곳(Transliteration: se-got)[common noun (non-inflected word)]+이(Transliteration: i)[nominative-case particle]

떨어지(Transliteration: tuhl-uh-jy)[general verb]+어서 (Transliteration: uh-suh)[subordinate connective-ending]

계단(Transliteration: Gae-dan)[common noun (non-inflected word)]+에서(Transliteration: ae-suh)[adverbial-case particle]

When the target-language sentence is "I fell down the stairs and fractured my leg in three places." in English, the input type is expressed as follows. As indicated below, the number of words/phrases of the dependency relation represents the number of words or phrases that are dependent upon each other. Furthermore, the number "−1" represents the inflected word that is the head word of the sentence. For example, the number of word "2", that is, the word "fell", is causally dependent upon the number of word "6", that is, the word "fractured", and the word "fractured" is the head word. Accordingly, the number of the word/phrase of the dependency relation is "−1". In addition, a syntactic mark "NP" represents a noun phrase, the mark "VP" represents a verb phrase, the mark "PP" represents a preposition phrase, and the mark "S" represents a sentence.

<Result of English Syntactic Analysis>

| Number of word/phrase | Number of word/phrase of dependency relation | Syntactic mark | surface type/part-of-speech/prototype |
| --- | --- | --- | --- |
| 1 | 6 | NP | I/PRP/i |
| 2 | 6 | VP | fell/VBP/fell |
| 3 | 2 | VP | down/RB/down |
| 4 | 2 | NP | the/DT/the stairs/NNS/stair |
| 5 | 6 | VP | and/CC/and |
| 6 | −1 | VP | fractured/VBD/fracture |
| 7 | 6 | NP | my/DT/my leg/NN/leg |
| 8 | 6 | PP | in/IN/in |
| 9 | 8 | NP | three/CD/three places/NNS/place |
| 10 | 6 | S | ./././ |

The apparatus for constructing the translation knowledge converts the source-language sentence and the target-language sentence into the form expressed with syntactic information (S410). The converting section 110 for converting the source-language sentence attaches the prototype, the part-of-speech, relative position information (B: the word presenting at a starting point of the syntax, I: the word presenting in the syntax, and O: the word not constituting the syntax) in a base phrase, and syntactic information (N: noun phrase, V: verb phrase, P: prepositional phrase, and so on) to each morpheme of the source-language sentence. The above-mentioned source-language sentence is converted as follows. Here, the symbol "eyNNF" denotes the common noun (non-inflected word), the symbol "eyPOC" denotes the adverbial-case particle, the symbol "eyVBB" denotes the common verb, and the symbol "eyEEG" denotes the subordinate connective-ending. In addition, the symbol "eyPOA" denotes the nominative-case particle, the symbol "eyERD" denotes the pre-final ending of past tense, the symbol "eyEEA" denotes the declarative final-ending, and the symbol "eySYA" denotes the ending mark.

<Sentence Conversion: Expresses Part-of-Speech, Prototype, Position Information, Syntactic Information to Morpheme>

계단(Transliteration: Gae-dan) |eyNNF| 계단(Transliteration: Gae-dan) ||B-N|

에서(Transliteration: ae-suh) |eyPOC| 에서(Transliteration: ae-suh) ||O|

떨어지(Transliteration: tuhl-uh-jy) |eyVBB| 떨어지(Transliteration: tuhl-uh-jy) ||B-V|

어서(Transliteration: uh-suh) |eyEEG| 어서(Transliteration: uh-suh) ||O|3|eyNUC|3|unit|B-N|

곳(Transliteration: got) |eyNNF| 곳(Transliteration: got) |unit|I-N|

이(Transliteration: i) |eyPOA| 이(Transliteration: i) ||O|

골절되(Transliteration: gol-juhl-doi) |eyVBB| 골절되(Transliteration: gol-juhl-doi) ||B-V|

었(Transliteration: ut) |eyERD| 었(Transliteration: ut) ||O|

습니다(Transliteration: seub-ni-da) |eyEEA| 습니다(Transliteration: seub-ni-da) ||O|

.|eySYA|.||O|

The converting section 120 for converting the target-language sentence attaches the prototype, the part-of-speech, the relative position information in the base phrase, and the syntactic information to each morpheme of the target-language sentence. The above-mentioned target-language sentence is converted as follows.

<Sentence Conversion: Expresses Part-of-Speech, Prototype, Position Information, Syntactic Information to Morpheme>

I|PRP|i||B-N|
fell|VBP|fell||B-V|
down|RB|down||I-V|
the|DT|the||B-N|
stairs|NNS|stair||I-N|
and|CC|and||O|
fractured|VBD|fracture||B-V|
my|DT|my||B-N|
leg|NN|leg||I-N|
in|IN|in||B-P|
three|CD|three||B-N|
places|NNS|place||I-N|
.|.|.||O|

The morpheme of the source language and the target language having the prototype, the part-of-speech, and the syntactic information is recognized as a token that is a basic unit of the translation to be input into the word-syntax aligning module 140.

The generating section 130 for generating the bilingual sentence map encodes the morpheme of the source language and the target language into the unique identification number of the morpheme so as to be capable of effectively aligning the words (S420). That is, the morpheme for constituting the sentence is substituted by the unique identification number.

The word aligning section 141 aligns the words by means of the unsupervised learning (S430).

After reconstructing the source-language sentence and the target-language sentence by using at least one of the surface type, the prototype, and the part-of-speech of the morpheme and generating pairs of a plurality of reconstructed sentences, the aligning section 141 searches the words corresponding to each other in the pairs of reconstructed source-language sentence and the target-language sentence. Accordingly, the word aligning section 141 outputs a plurality of results of the word alignment by using at least one of the surface type, the prototype, and the part-of-speech of the morpheme.

Two examples for reconstructing the above-mentioned source-language sentence and the target-language sentence will be described. One example is to reconstruct the source-language sentence and the target-language sentence by using only the surface type of the morpheme, and the other example is to reconstruct the source-language sentence and the target-language sentence by using both the surface type and the part-of-speech of the morpheme. Each of the reconstructed results is as follows.

<Reconstruct sentence by using only Surface Type of Morpheme>

"계단에서 골절되

3 곳 이 골절되 었 습니다.(Transliteration: Gae-dan-ae-suh-tuhl-uh-jy-uh-suh-se-got-i-gol-juhl-doi-ut-seub-ni-da; Translation: three places are fractured as result of falling off the stairs)

I fell down the stairs and fractured my leg in three places.

<Reconstruct Sentence by using Both Surface Type and Part-of-Speech of Morpheme>

계단(Transliteration: Gae-dan)|eyNNF 에서(Transliteration: ae-suh)|eyPOC 떨어지(Transliteration: tuhl-uh-jy) |eyVBB 어서(Transliteration: uh-suh)|eyEEG 3|eyNUC 곳(Transliteration: got)|eyNDA 이(Transliteration: i)|eyPOA 골절되(Transliteration: gol-juhl-doi)|eyVBB 었(Transliteration: ut)|eyERD 습니다(Transliteration: seub-ni-da) |eyEEA.|eySYA I|PRP fell|VBP down|RB the|DT stairs|NNS and|CC fractured|VBD my|DT leg|NN in|IN three|CD places|NNS.|.

As described above, in a pair of the source-language sentence and the target-language sentence reconstructed by using only the surface type, and in a pair of the source-language sentence and the target-language sentence reconstructed by using both the surface type and the part-of-speech of the morpheme, the words corresponding to each other in the source-language sentence and the target-language sentence are searched by the unsupervised learning, respectively. Consequently, the results of the word alignment obtained by using the surface type and the result of the word alignment obtained by using both the surface type and the part-of-speech of the morpheme are output.

The post-processor 142 modifies the alignment error of the word aligning section 141 and post-processes the word alignment (S440). The post-processor 142 corrects the results of the word alignment by using the previously held bilingual dictionary. Moreover, the post-processor 142 determines a proper word alignment as a word alignment that is obtained by, with respect to the plurality of results of the word alignment, excluding the corrected word alignment results and taking an intersection set. The others are removed from the results of the word alignment.

The bilingual dictionary to be used is composed of high-frequency words. Furthermore, the bilingual dictionary is previously constructed by an expert or in an automatic manner. At this time, errors of the bilingual dictionary are removed by a filtering process. All results of the word alignment are not corrected and post-processed, but two or more excellent results of the word alignment may be selectively corrected or post-processed.

The word alignment-based syntax aligning section 143 aligns the syntax by using the information on the dependency relation of the source language and the result of the word alignment (S450). The syntax of the source language and the target language should each be continuous word sequences. In addition, the aligning section 143 performs mapping of the word sequence of the target language aligned with the source-language words and determines a boundary of the syntax by means of the dependency relationship between of the source-language words.

The extractor 151 extracts the translation knowledge on the word/syntax by receiving the results of the word/syntactic alignment by the word-syntax aligning module 140 (S460). At this time, erroneous knowledge may be included in the extracted translation knowledge due to the alignment error. Accordingly, after filtering the extracted translation knowledge by using appearance frequency of the word and syntax and a statistic-verification method, it is stored in the database of the word/syntax translating dictionary.

Figure 5:
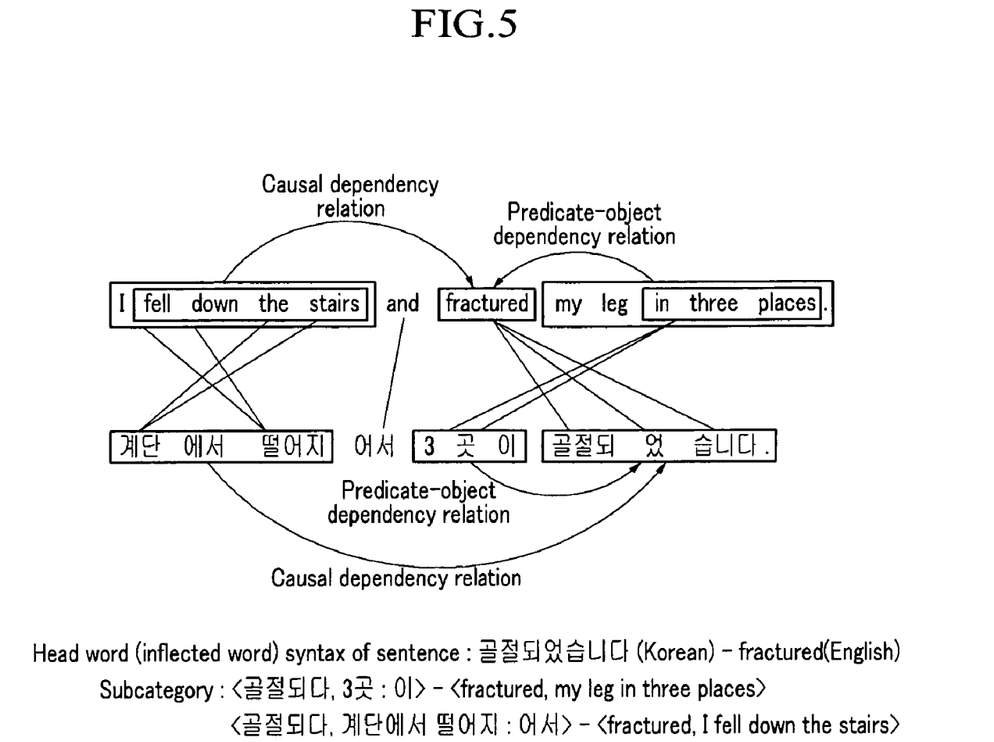
FIG. 5 is a view illustrating a process of extracting translation knowledge on a subcategory of a bilingual inflected-word.

The extractor 152 automatically extracts the translation knowledge on the subcategory of the bilingual inflected-word (S470). A process for extracting the translation knowledge on the subcategory of the bilingual inflected-word will now be described with reference to FIG. 5. FIG. 5 is a view illustrating the process for extracting the translation knowledge on the subcategory of the bilingual inflected-word.

First, the inflected word serving as a head word is searched by using the information on the dependency relationship in the source-language sentence. The inflected word is 골절되었습니다.(Transliteration; gol-juhl-doi-ut-seub-ni-da; Translation: fractured)" in FIG. 5: Next, the extractor 152 forms the subcategory frame of the inflected word by tracking the word/syntax, which is dependently associated with the head word, in the source-language sentence. Referring to FIG. 5, "3곳이(Transliteration: se-got-i Translation: three places)"

in Korean is a predicate-object dependency relationship with respect to the inflected word, and for example, 골절되었습니다.(Transliteration: gol-juhl-doi-ut-seub-ni-da; Translation: fractured)" in Korean and "계단에서떨어져(Transliteration: Gae-dan-ae-suh-tuhl-uh-jy Translation: as result of falling off the stairs)" in Korean is the causal dependency relationship with respect to 골절되었습니다.(Transliteration: gol-juhl-doi-ut-seub-ni-da; Translation: fractured)" in Korean. Furthermore, the extractor 152 expresses as a form of the feature structure by searching the parallel-translation of each word and syntax in the aligned target-language sentence. Referring to FIG. 5, the parallel-translation of "3곳이(Transliteration: se-got-i)" in Korean is "my leg in three places" in English, and the parallel-translation of "계단에서떨어져(Transliteration: Gae-dan-ae-suh-tuhl-uh-jy)" in Korean is "I fell down the stairs" in English. The feature structure is composed of the arrangement order of each word/syntax in the sentence and the parallel-translation relationship between each word/syntax and the subcategory of the inflected word in the source language. In addition, ultimately, the extractor 152 stores the extracted translation knowledge in a database for translation pattern of the subcategory of the inflected word by connecting the information on the parallel-translation feature structure of the target language to the subcategory frame of the inflected word in the source language.

The extractor 153 extracts the translation knowledge on the sentence pattern from the sentence using the idiomatic expression (S480). At this time, a key factor is to search the idiomatic expression. The extractor 153 statically analyzes fertility of the word/syntax in the target language with respect to each word/syntax in the source language from the result of the word and syntax alignment. Furthermore, the extractor 153 extracts a pair of sentences including the word/syntax having fertility of more than a mean distribution to store it in the database for the bilingual sentence pattern by extracting the translation knowledge on the sentence pattern from the pair of sentences.

The cluster 154 divides the extracted translation knowledge into groups that are the same in meaning and allows the extracted translation knowledge to be generalized (S490). The cluster 154 is constituted, provided Korean syntaxes adopting the same English syntax as a parallel-translation have the same meaning. For example, when the parallel-translation of "갈아타는 비행기(Transliteration: gal-ah-ta-neun-bi-hang-gi)" in Korean is "transit flight" in English, and when the parallel-translation of "연결편 비행기(Transliteration: yen-gyul-pyun-bi-hang-gi)" in Korean is also "transit flight" in English, the cluster is constituted as a transit_flight_class= { "연결편 비행기(Transliteration: gal-ah-ta-neun-bi-hang-gi), "연결편 비행기(Transliteration: yen-gyul-pyun-bi-hang-gi)}. For this reason, the "갈아타는 비행기(Transliteration: gal-ah-ta-neun-bi-hang-gi)" and "연결편 비행기(Transliteration: yen-gyul-pyun-bi-hang-gi)" in Korean are recognized as Korean syntax having the same meaning, and these Korean syntaxes are substituted by a cluster name, whereby the translation knowledge is generalized.

The acquired translation knowledge is used in a pattern-based or statistics-based automatic translator 400 so as to generate the sentence in the target language from the sentence in the input source language.

The exemplary embodiment of the invention is not necessarily embodied by only the above-described apparatus and/or method, but can be embodied by, for example, a program that achieves the function corresponding to the configuration of the exemplary embodiment of the invention and a recording medium in which the program is recorded. This will be easily recognized from the above-described exemplary embodiment by those skilled in the related art.

While this invention has been particularly described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of constructing translation knowledge, comprising:
   receiving a source-language sentence and a target-language sentence corresponding to translation of the source-language sentence, which being performed by a constructing translation knowledge apparatus;
   converting the source-language sentence and the target-language sentence into a form that is expressed with syntactic information, which being performed by the constructing translation knowledge apparatus;
   performing word alignment and syntactic alignment of the converted source-language sentence and the converted target-language sentence, which being performed by the constructing translation knowledge apparatus; and
   extracting translation knowledge on a subcategory of a bilingual inflected-word from results of the word alignment and the syntactic alignment by using information on dependency relationship, which being performed by the constructing translation knowledge apparatus,
   wherein the performing includes:
      reconstructing the converted source-language sentence and the converted target-language sentence by using at least one of a surface type, a prototype, and a part-of-speech of a morpheme, and generating pairs of a plurality of reconstructed sentences;

outputting a plurality of results of the word alignment by searching words corresponding to each other in the source-language sentence and the target-language sentence with respect to the pairs of the plurality of reconstructed sentences;

correcting the results of the word alignment by using a previously held bilingual dictionary;

post-processing that determines a proper word alignment as a word alignment that is obtained by, with respect to the plurality of results of the word alignment, excluding the corrected word alignment results and taking an intersection set; and performing the syntactic alignment by using the result of the proper word alignment and information on dependency relationship of the source language.

2. The method of claim 1, further comprising substituting a morpheme constituting the converted source-language sentence and the target-language sentence by a unique identification number of the morpheme, wherein the performing is to perform the word alignment and the syntactic alignment of the source-language sentence and the target-language sentence substituted by the unique identification number of the morpheme.

3. The method of claim 1, further comprising:

extracting translation knowledge on words and syntaxes from the results of the word alignment and the syntactic alignment; and extracting translation knowledge on a bilingual sentence pattern from the results of the word alignment and the syntactic alignment.

4. The method of claim 3, wherein the extracting of the translation knowledge on the bilingual sentence pattern comprises:

statically analyzing fertility of a word and syntax in a target language with respect to each word and syntax in a source language from the results of the word alignment and the syntactic alignment; and extracting the translation knowledge on the bilingual sentence pattern from pairs of a source-language sentence and a target-language sentence including words and syntaxes having fertility of more than a mean distribution and storing the extracted translation knowledge.

5. The method of claim 1, wherein the source-language sentence and target-language sentence are input by performing morpheme analysis, part-of-speech tagging, and syntactic analysis.

6. The method of claim 1, wherein the converting comprises:

attaching a prototype, a part-of-speech of a morpheme, and relative position information and syntactic information of the morpheme in a base phrase to each morpheme of the source-language sentence; and attaching a prototype, a part-of-speech of a morpheme, and relative position information and syntactic information of the morpheme in a base phrase to each morpheme of the target-language sentence.

7. The method of claim 1, wherein the extracting includes:

searching an inflected word serving as a head word by using the information on the dependency relationship in the source-language sentence;

forming a subcategory frame of the inflected word by tracking a word and syntax that depends on the inflected word;

searching parallel-translation of each word and syntax of the source-language sentence in the target-language sentence; and extracting translation knowledge on the subcategory of the inflected word by connecting the parallel-translation of the word and syntax to the subcategory frame of the inflected word.

8. The method of claim 7, wherein the parallel-translation of the word and syntax is expressed as a form of feature structure.

9. An apparatus for constructing translation knowledge, comprising a converting section that converts a source-language sentence and a target-language sentence by receiving the source-language sentence and the target-language sentence corresponding to the source-language sentence and attaching a prototype, a part-of-speech, relative position information, and syntactic information in a base phrase to each morpheme of the source-language sentence and the target-language sentence;

a word-syntax aligning module that aligns words and syntaxes by applying a previously held bilingual dictionary and an algorithm for unsupervised learning; and a translation knowledge acquiring module that acquires translation knowledge on a word and syntax, translation knowledge on a subcategory of a bilingual inflected-word, and translation knowledge on a bilingual sentence pattern based on results of syntactic alignment by the word-syntax aligning module, wherein the word-syntax aligning section comprises:

a word aligning section that outputs a plurality of results of the word alignment by searching words corresponding to each other in the source-language sentence and the target-language sentence with respect to the pairs of the plurality of reconstructed sentences, after reconstructing the converted source-language sentence and target-language sentence by using at least one of a surface type, a prototype, and a part-of-speech of a morpheme, and generating pairs of a plurality of reconstructed sentences;

a post-processor for post-processing the word alignment, which corrects the results of the word alignment by using the previously held bilingual dictionary and that determines a proper word alignment as a word alignment that is obtained by, with respect to the plurality of results of the word alignment, excluding the corrected word alignment results and taking an intersection set; and a syntax aligning section that performs the syntactic alignment by using the result of the proper word alignment and information on dependency relationship between the syntaxes.

10. The apparatus of claim 9, wherein the source-language sentence and target-language sentence are input by performing morpheme analysis, part-of-speech tagging, and syntactic analysis.

11. The apparatus of claim 9, further comprising a generating section for generating a bilingual sentence map, which substitutes a morpheme constituting the converted source-language sentence and target-language sentence by a unique identification number of the morpheme.

12. The apparatus of claim 9, wherein the translation knowledge acquiring module comprises:

an extractor for extracting translation knowledge of words and syntaxes, which receives the results of the word and syntactic alignment, extracts translation information on the words and syntaxes, and stores the extracted translation information;

an extractor for extracting translation knowledge on a subcategory of a bilingual inflected-word, which searches an inflected word serving as a head word by using information on dependency relationship in the source-language sentence, searches parallel-translation of each word and syntax of the source-language sentence in the target-language sentence after forming a subcategory frame of the inflected word by tracking a word and syntax that depends on the inflected word, and extracts the translation knowledge on the subcategory of the inflected word by connecting the parallel-translation of the word and syntax to the subcategory frame of the inflected word; and an extractor for extracting translation knowledge of a subcategory of a bilingual sentence pattern, which extracts a translation pattern with a sentence using an idiomatic expression and stores the extracted translation pattern.

* * * * *